United States Patent
Blum et al.

(10) Patent No.: US 9,873,768 B2
(45) Date of Patent: *Jan. 23, 2018

(54) PBI MODIFICATION AND CROSS-LINKING METHODS

(71) Applicant: WHITEFOX TECHNOLOGIES LIMITED, London (GB)

(72) Inventors: Stephan Rüdiger Blum, Calgary (CA); Katharina Kleine, Paderborn (DE); Wolfgang Bremser, Dahl (DE)

(73) Assignee: WHITEFOX TECHNOLOGIES LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,039

(22) Filed: Dec. 22, 2015

(65) Prior Publication Data

US 2016/0108177 A1    Apr. 21, 2016

Related U.S. Application Data

(62) Division of application No. 13/821,390, filed as application No. PCT/DE2011/001690 on Sep. 7, 2011, now Pat. No. 9,221,951.

(30) Foreign Application Priority Data

Sep. 7, 2010 (DE) .................. 10 2010 044 579

(51) Int. Cl.
     *C08G 73/18*      (2006.01)
     *C08G 73/06*      (2006.01)

(52) U.S. Cl.
     CPC ......... *C08G 73/18* (2013.01); *C08G 73/0677* (2013.01)

(58) Field of Classification Search
CPC .......................... C08G 73/18; C08G 73/0677
USPC .................................. 528/540, 423; 525/540
See application file for complete search history.

(56) References Cited

U.S. PATENT DOCUMENTS

| | | | |
|---|---|---|---|
| 6,362,313 B1 | 3/2002 | Arnold et al. | |
| 7,229,553 B2 | 6/2007 | Uensal et al. | |
| 9,221,951 B2 * | 12/2015 | Blum | C08G 73/0677 |
| 2004/0261616 A1 | 12/2004 | Jorgensen et al. | |

FOREIGN PATENT DOCUMENTS

WO    WO02070592    9/2002

OTHER PUBLICATIONS

International Search Report and Written Opinion dated Mar. 26, 2012 issued for International PCT Application No. PCT/DE2011/001690.
File "Home" Entered on Dec. 2, 2014, American Chemical Society, News Express.
File "Registry" Entered on Dec. 2, 2014, American Chemical Society, TSCA Information.

\* cited by examiner

*Primary Examiner* — Duc Truong
(74) *Attorney, Agent, or Firm* — K&L Gates LLP

(57) ABSTRACT

The present disclosure provides methods for modifying and cross-linking polybenzimidazoles, PBI. In one embodiment, the polybenzimidazole reacts with a compound, which has a halogen and a double bond functionality and which comprises a halogen and an organic group to form modified polymers by means of a nucleophilic substitution of the amine proton of the benzimidazole functionality in a solution, and a functional group is connected via each resulting free double bond and/or the polymers that are thus modified are cross-linked.

14 Claims, No Drawings

PBI MODIFICATION AND CROSS-LINKING METHODS

PRIORITY CLAIM

The present application is a divisional application of U.S. patent application Ser. No. 13/821,390, filed May 28, 2013 now U.S. Pat. No. 9,221,951 (371 (c) date), which is a national stage entry of International Application No. PCT/DE2011/001690, filed on Sep. 7, 2011, which claims priority to German Patent Application Number DE 10 2010 044 579.7, filed on Sep. 7, 2010. The entire disclosure of each of these applications is incorporated by reference herein.

SUMMARY

The present disclosure provides methods for the modification and cross-linking of polybenzimidazole ("PBI").

PBI fibers, a product of space exploration in the 1980s, originally served as the upper material of fire protective clothing.

Because of its extraordinary thermal and chemical resistance, PBI has now found its way into the production of fuel cells as a membrane material and is used especially as a material for high-temperature membranes in polymer electrolyte fuel cells ("PEFC"). PBI often serves as a matrix for proton-conducting phosphoric acid because PBI withstands the high temperatures of such fuel cells without problem but is itself a very poor proton conductor, and therefore regularly needs corresponding doping.

Such doping has the advantage that by the choice of a suitable dopant, membranes can be produced for fuel cells for both acidic and alkaline fuels, for example with KOH as a dopant in the case of alkaline fuels.

However, a disadvantage of such doping is the migration of the dopant during operation of the fuel cell, so that the initial high proton conductivity then decreases significantly over the lifetime of the fuel cell.

Another disadvantage is the low mechanical stability of highly doped PBI membranes. This can be encountered, for example, in the case of cross-linking of polymers with difunctional halogen compounds according to U.S. Patent Publication No. 2004/0261616 or difunctional epoxides and isocyanates according to published German Patent Application No. DE 101 10 752 A1. However, in the case of the methods described there, the cross-linking reaction and the competing doping process both take place because of the imidazole functionality, especially in the case of the amine proton.

Against this technical background, the present disclosure provides methods for preparing a modified PBI polymer that is easy to manufacture, and, in particular when used as a starting material for the membrane, can be largely freely functionalized and/or cross-linked.

DETAILED DESCRIPTION

This technical problem is solved by the procedure as disclosed herein.

In one embodiment, a PBI with the structure

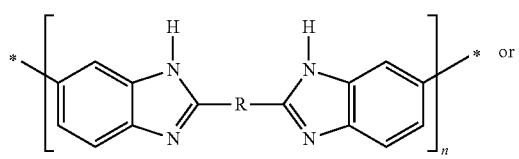 or

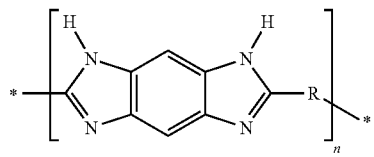

is reacted in a solution, with a compound of a halogen and a double bond functionality of the type

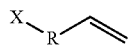

where X is a halogen and R an organic group, for example an alkyl halide, in particular 3-bromopropene, which by a nucleophilic substitution of the amine proton of the benzimidazole functionality enables the modified polymers

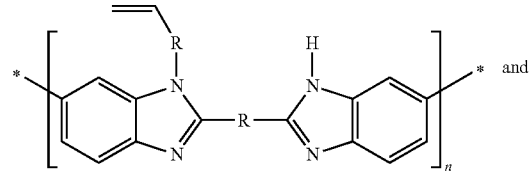 and

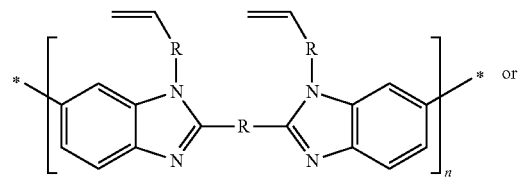 or

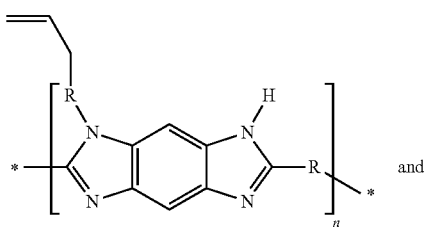 and

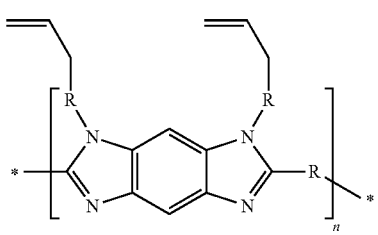

to be obtained. The free double bonds are now available for cross-linking or functionalization of the thus modified polymer in a simple manner.

The modified polymers in the form of precipitated powder or granules can be mixed later with a cross-linking agent also in powder form under suitable reaction conditions in order to form a molded part.

If a molded part such as a membrane or a film is produced from the solution, then the modified polymers, in particular allyl-functionalized polymers, can be cross-linked directly or indirectly to one another with or without an initiator, whereby a non-soluble molded part is obtained.

The cross-linking between two modified polymers can be obtained indirectly via a cross-linking molecule having at least two double bonds. After the successful reaction of the original PBI, a compound having a halogen and a double bond functionality is added to the solution, which then has the modified polymers or, after production of a molded part, this may be introduced into a solution together with a component not dissolving the molded part along with the cross-linking agent, and the cross-linking agent diffuses into the molded part. Cross-linking is then obtained again through associated heat treatment.

A particularly stable cross-linking is the direct crosslinking of two modified polymers via two double bonds, which is described below in the explanation of an embodiment.

In one embodiment, a polymer solution with polybenzimidazole having the structure

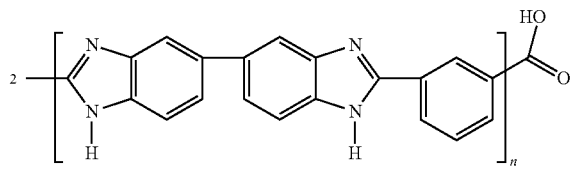

is obtained by the addition of LiCl to improve the solubility and by the addition of a catalyst, preferably a bicyclic tertiary amine, such as triethylenediamine or 1,4-diazabicyclo[2.2.2]octane or TEDA or DABCO in dimethylacetamide, DMAc, is used as the solvent.

4n 3-bromopropene (allyl bromide) is added as a compound having a halogen and a double bond functionality:

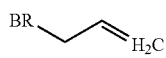

Following a reaction time of about 8 to 24 hours, 4n HBr can be desorbed by heating the solution to about 40° C., and a modified polymer is obtained having the structure

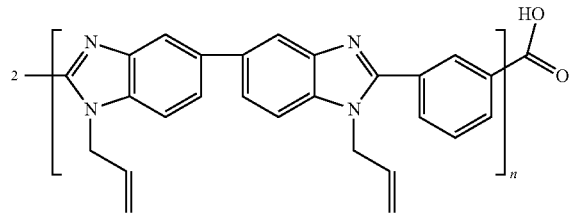

Films can be drawn from the solution and the LiCl washed out.

The subsequent cross-linking is effected in an oven under the influence of temperature to form:

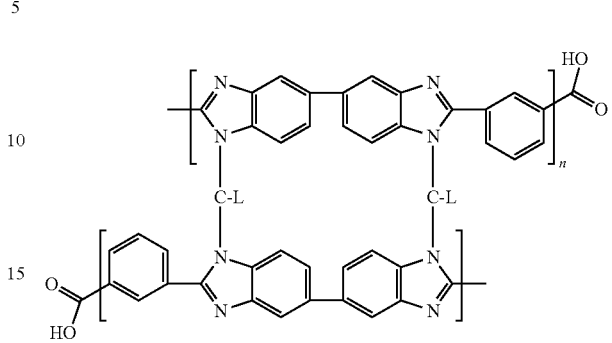

where C-L stands for cross-linking and can represent one of the above-mentioned bonding functions.

Surprisingly, the failure temperature of the modified cross-linked polymers at around 528° C. when tested by thermogravimetric analysis is only slightly lower than that of the original polymers at around 536° C., but this was expected due to the linking of an aliphatic chain.

On the other hand, the behavior of the modified cross-linked polymers when subjected to dynamic mechanical analysis, denotes a significantly higher modulus of elasticity of the modified cross-linked polymers at high temperatures, which indicates very good cross-linking.

Accordingly, in one embodiment, cross-linking can be provided that connects a functional group with at least two double bonds to a double bond of a modified polymer.

Thus from the point of view of acidic membranes for fuel cells, it is considered in particular that the functional group would have a high proton conductivity, such as vinylphosphonic acid, or 1-allyl-3-methylimidazolium chloride.

Thus one obtains an acidic PBI when a stoichiometric amount of vinylphosphonic acid to the allyl units and an initiator such as tert-butyl perbenzoate is added to a 3% aqueous solution of an allyl-functionalized PBI in DMAc as described above.

The reaction solution is heated under nitrogen at 140° C. for 4 hours to reflux.

The functional group may also be an amine group, through which, in particular, the existing alkaline properties of the PBI can be further emphasized. This may be beneficial in the production of $H_2/CO_2$-selective, alkaline then anion-conducting gas-separation membranes.

For such membranes, it may also be advantageous when the functional group is based on an ionic liquid, for example, connected to the allyl-bonding imidazolium. In the case of membranes based on known ionic liquids, it is known that loss of conduction may occur due to migration of the ionic liquid. By using 1-allyl-3-methylimidazolium chloride, one can connect the ionic liquid covalently to the modified polymer, and thus prevent the migration.

In another embodiment, the functional group decreases the degree of crystallization of the polybenzimdazole, for example by the connection of a bulky group such as allylbenzene or allyl p-toluol sulfate.

In addition, the formation of copolymers is not a problem when a monomer having a double bond is connected to the double bond of a modified polymer, which can, for example, take place by means of a radical polymerization.

As an example of functionalization and cross-linking of the modified polymers, reference is also made to the possibility of producing a film or a membrane made from an allyl-functionalized PBI and then soaking it in an appropriate solution, for example, vinylphosphonic acid, if necessary with the addition of a cross-linking agent, in order to obtain a reaction between the allyl function and the vinyl phosphonic acid in an oven and achieve the cross-linking.

Another example of functionalization and linking of the modified polymer is the addition of triallyl isocyanurate, tradename TAIC, known as a co-activator for peroxide cross-linking, which enables a variety of three double bond cross-linking possibilities. Furthermore, triallyl isocyanurate, as a polyfunctional allylic monomer, can itself polymerize or effect a connection of a functional group to one of the double bonds.

The invention claimed is:

1. A membrane including a polymer of formula

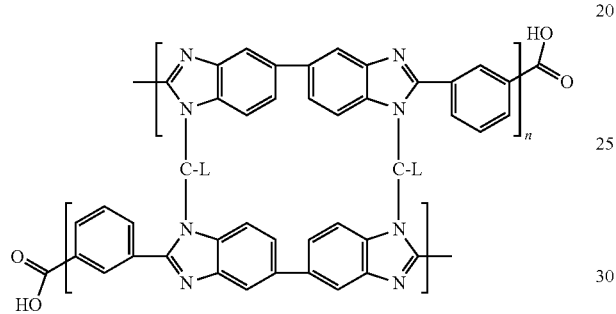

wherein C-L is a crosslinker, and wherein the polymer further includes at least one functional group.

2. The membrane of claim 1, wherein the polymer is acidic.

3. The membrane of claim 2, wherein the at least one functional group is vinylphosphonic acid.

4. The membrane of claim 2, wherein the at least one functional group is 1-allyl-3-methylimidazolium chloride.

5. The membrane of claim 4, wherein the at least one functional group and the polymer form a zwitterion.

6. The membrane of claim 1, wherein the polymer is alkaline.

7. The membrane of claim 6, wherein the at least one functional group is amine functional group.

8. The membrane of claim 1, wherein the at least one functional group is bound at least to a nitrogen atom of the polymer.

9. The membrane of claim 1, wherein the crosslinker comprises one or more of:

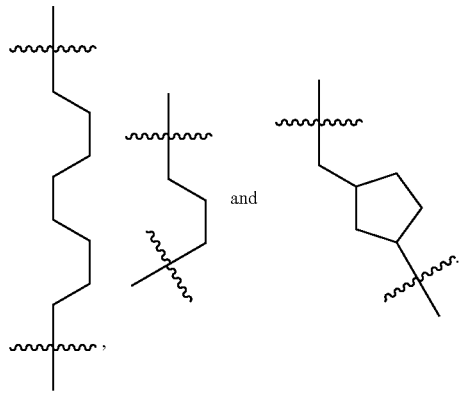 [SMILES: *CCCCCCCC* ; *CCC* ; *CC1CCC(*)C1]

10. The membrane of claim 1, wherein the membrane is a hydrogen/carbon dioxide selective membrane.

11. The membrane of claim 1, wherein the membrane conducts anions.

12. The membrane of claim 1, wherein the membrane is configured for use in a fuel cell.

13. The membrane of claim 1, wherein the polymer has a failure temperature of about 528° C.

14. The membrane of claim 1, wherein the membrane is a gas-separation membrane.

* * * * *